United States Patent
Pinheiro et al.

(10) Patent No.: US 9,572,021 B2
(45) Date of Patent: Feb. 14, 2017

(54) ALLOCATION OF INTERNET PROTOCOL (IP) ADDRESSES AND USAGE DURING SHORT MESSAGE SERVICE (SMS) TRANSMISSION

(75) Inventors: Ana Lucia Pinheiro, Phoenixville, PA (US); Jean-Louis Gauvreau, La Prairie (CA); Behrouz Aghili, Commack, NY (US); Joseph M. Murray, Schwenksville, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 13/098,646

(22) Filed: May 2, 2011

(65) Prior Publication Data

US 2012/0110145 A1  May 3, 2012

Related U.S. Application Data

(60) Provisional application No. 61/330,759, filed on May 3, 2010.

(51) Int. Cl.
*H04W 4/14* (2009.01)
*H04W 8/04* (2009.01)
(Continued)

(52) U.S. Cl.
CPC .......... *H04W 8/26* (2013.01); *H04L 29/12216* (2013.01); *H04L 61/106* (2013.01);
(Continued)

(58) Field of Classification Search
CPC .......... H04W 8/26; H04W 8/04; H04W 4/005; H04W 4/14; H04L 61/2007; H04L 61/10; H04L 61/106; H04L 29/12216
(Continued)

(56) References Cited

U.S. PATENT DOCUMENTS 5,590,133 A   12/1996  Billstrom et al.
7,289,462 B1  10/2007  Mizell et al.
(Continued)

FOREIGN PATENT DOCUMENTS

CN  101077018 A  11/2007
CN  101584245 A  11/2009
(Continued)

OTHER PUBLICATIONS

3rd Generation Partnership Project, "3GPP TS 22.368 V10.0.0 Technical Specification Group Services and System Aspects; Service requirements for Machine-Type Communications (MTC)"; Mar. 2010, 3GPP Organizational Partners, Stage 1 (Release 10), p. 6-7.*

(Continued)

*Primary Examiner* — Eleni Shiferaw
*Assistant Examiner* — Nelson Giddins
(74) *Attorney, Agent, or Firm* — Condo Roccia Koptiw LLP

(57) ABSTRACT

Embodiments contemplate techniques and devices for allocating IP addresses for MTC devices, transmitting and receiving SMS using the allocated IP addresses. The MTC device may be allocated with an IP address without activating a packet data protocol (PDP) context. In addition, after the IP address has been allocated, SMS messages may be transmitted from and to MTC devices using the IP address.

14 Claims, 6 Drawing Sheets

(51) Int. Cl.
| | |
|---|---|
| H04L 29/08 | (2006.01) |
| H04L 29/12 | (2006.01) |
| H04W 4/00 | (2009.01) |
| H04W 8/26 | (2009.01) |

(52) U.S. Cl.
CPC ......... *H04L 61/2007* (2013.01); *H04W 4/005* (2013.01); *H04L 67/26* (2013.01); *H04W 4/14* (2013.01); *H04W 8/04* (2013.01)

(58) Field of Classification Search
USPC .......................................................... 709/220
See application file for complete search history.

(56) References Cited

U.S. PATENT DOCUMENTS

| | | | |
|---|---|---|---|
| 7,502,339 | B1 | 3/2009 | Pirkola et al. |
| 7,505,769 | B2 | 3/2009 | Jiang |
| 8,098,673 | B2 | 1/2012 | Ljung et al. |
| 8,195,168 | B2 | 6/2012 | Jansson |
| 8,781,442 | B1* | 7/2014 | Link, II .................... 455/411 |
| 2002/0077131 | A1* | 6/2002 | Mizell et al. ................. 455/466 |
| 2002/0159387 | A1* | 10/2002 | Allison et al. ................. 370/229 |
| 2003/0013467 | A1* | 1/2003 | Caloud .......................... 455/466 |
| 2003/0174689 | A1* | 9/2003 | Fujino .............. H04M 15/8033 370/349 |
| 2004/0023664 | A1* | 2/2004 | Mirouze .................. G09F 27/00 455/456.1 |
| 2005/0078660 | A1* | 4/2005 | Wood ............................ 370/352 |
| 2005/0172026 | A1 | 8/2005 | Jeon et al. |
| 2005/0282565 | A1* | 12/2005 | Shaheen ........................ 455/466 |
| 2007/0015501 | A1* | 1/2007 | Wilson .......................... 455/424 |
| 2007/0142029 | A1* | 6/2007 | Willehadson ......... H04L 12/581 455/405 |
| 2007/0165561 | A1* | 7/2007 | Veerepalli ............. H04W 80/04 370/328 |
| 2008/0153521 | A1* | 6/2008 | Benaouda et al. ............. 455/466 |
| 2008/0261565 | A1* | 10/2008 | Kunz et al. ................ 455/414.1 |
| 2008/0263353 | A1* | 10/2008 | Droms et al. ................. 713/153 |
| 2008/0274719 | A1* | 11/2008 | Russell et al. ............. 455/412.1 |
| 2009/0075669 | A1* | 3/2009 | Franceschini et al. .... 455/452.2 |
| 2009/0131022 | A1* | 5/2009 | Buckley et al. ............ 455/412.1 |
| 2010/0214929 | A1* | 8/2010 | Ljung et al. ................... 370/241 |
| 2010/0273462 | A1* | 10/2010 | Thorn et al. ............... 455/414.1 |
| 2011/0053618 | A1* | 3/2011 | Lin et al. ....................... 455/466 |
| 2011/0165860 | A1* | 7/2011 | Cai et al. ....................... 455/466 |
| 2011/0292923 | A1* | 12/2011 | Noldus ........................... 370/338 |

FOREIGN PATENT DOCUMENTS

| | | |
|---|---|---|
| EP | 1671501 B1 | 8/2008 |
| WO | WO 00/79813 A1 | 12/2000 |
| WO | WO 03/103198 A1 | 12/2003 |

OTHER PUBLICATIONS

3rd Generation Partnership Project, "3GPP TS 23.204 V8.5.0 3rd Generation Partnership Project; Technical Specification Group Services and System Aspects; Support of Short Message Service (SMS) over generic 3GPP Internet Protocol (IP) access"; Mar. 2010, 3GPP Organizational Partners, Stage 2 (Release 8).*
3rd Generation Partnership Project, "3GPP TS 24.341 V8.0.0 3rd Generation Partnership Project; Technical Specification Group Core Network and Terminals; Support of SMS over IP networks"; Dec. 2008, 3GPP Organizational Partners, Stage 3 (Release 8).*
3rd Generation Partnership Project, "3GPP TS 24.341 V9.1.0 3rd Generation Partnership Project; Technical Specification Group Core Network and Terminals; Support of SMS over IP networks"; Jun. 2010, 3GPP Organizational Partners, Stage 3 (Release 9).*
3rd Generation Partnership Project (3GPP), S2-096571, "A Control Plane architecture for machine-type communications", LG Electronics, 3GPP TSG SA WG2 Meeting #76, San Jose Del Cabo, Mexico, Nov. 16-20, 2009, 9 pages.
3rd Generation Partnership Project (3GPP), TR 23.888 V1.2.0, "3rdGeneration Partnership Project; Technical Specification Group Services and System Aspects; System Improvements for Machine-Type Communications; (Release 11)", Apr. 2011, 111 pages.
3rd Generation Partnership Project (3GPP), TR 23.888V0.3.1, "3rd Generation Partnership Project; Technical Specification Group Services and System Aspects; System Improvements for Machine-Type Communications; (Release 10)", Mar. 2010, 33 pages.
3rd Generation Partnership Project (3GPP), TD S2-105731, "Support of 'PS Only' Feature in GPRS/UMTS for MTC", InterDigital Communications, SIMTC/Rel 11, 3GPP TSG SA WG2 Meeting #82, Jacksonville, USA, Nov. 15-19, 2010, 1-3.
3rd Generation Partnership Project (3GPP), TS 29.002 V6.2.0, "Technical Specification Group Core Network, Mobile Application Part (MAP) Specification, (Release 6)", Jun. 2003, 1-1292.
Stapp et al., "The Dynamic Host Configuration Protocol (DHCP) Client", Fully Qualified Domain Name (FQDN) Option, Network Working Group, Standards Track, Oct. 2006, 1-17.
$3^{rd}$ Generation Partnership Project (3GPP), TR 22.868, V8.0.0, "Technical Specification Group Services and System Aspects; Study on Facilitating Machine to Machine Communication in 3GPP Systems," Release 8, Mar. 2003, pp. 15.
$3^{rd}$ Generation Partnership Project (3GPP), TS 23.040, V9.2.0, "Technical Specification Group Core Network and Terminals; Technical Realization of the Short Message Service (SMS)," Release 9, Mar. 2010, pp. 202.
3GPP TSG-SA WG1 Meeting #49, "Study on Alternatives to E. 164 for Machine-Type Communications," T-Mobile USA, San Francisco, Feb. 22-26, 2010, pp. 5.
$3^{rd}$ Generation Partnership Project (3GPP), TS 23.060 V9.4.0 "3rd Generation Partnership Project; Technical Specification Group Services and System Aspects; General Packet Radio Service (GPRS); Service description; Stage 2", Release 9, Mar. 2010, pp. 297.
3rd Generation Partnership Project (3GPP), TD S2-101135, "Online Small Data Transmission without MSISDN", Samsung, 3GPP TSG SA WG2 Meeting #78, San Francisco, USA, Feb. 22-26, 2010, 7 pages.
3rd Generation Partnership Project (3GPP), TS 23.040 V9.1.0, "Technical Specification Group Core Network and Terminals, Technical Realization of the Short Message Service (SMS) (Release 9)", Sep. 2009, 4 pages.
$3^{rd}$ Generation Partnership Project (3GPP), S1-100461, "Study on Alternatives to E.164 for Machine-Type Communications", T-Mobile USA, 3GPP TSG-SA WG1, Meeting #49, San Fransisco, USA, Feb. 22-26, 2010, 5 pages.
Ericsson et al., "Device triggering and E.164 MSISDN replacement," 3GPP TSG SA WG2 Meeting #78 TD S2-101169, 3GPP, San Francisco, Feb. 22-26, 2010, 5 pages.
Ericsson et al., "APN based Policing solution for MTC Groups," 3GPP TSG SA WG2 Meeting #78 TD S2-101168, 3GPP, San Francisco, Feb. 22-26, 2010, 8 pages.
InterDigital Communications, LLC, "Options to handle Alternatives to E.164 Numbers in Machine Type Communications", 3GPP TSG-SA WG1 Meeting #50 S1-101007, 3GPP, Venice, Italy, May 10-14, 2010, 7 pages.
LG Electronics et al., "Mobile Terminated communication with MTC devices inside private IP address space," 3GPP TSG SA WG2 Meeting #78 TD S2-101667, 3GPP, San Francisco, Feb. 22-26, 2010, 11 pages.

* cited by examiner

ALLOCATION OF INTERNET PROTOCOL (IP) ADDRESSES AND USAGE DURING SHORT MESSAGE SERVICE (SMS) TRANSMISSION

CROSS REFERENCE TO RELATED APPLICATION

This application claims the benefit of U.S. Provisional Patent Application No. 61/330,759, filed May 3, 2010, the content of which is hereby incorporated by reference in its entirety.

BACKGROUND

A machine type communications (MTC) device refers to, for example, user equipment (UE) equipped for machine type communication, which communicates through a public land mobile network (PLMN) with MTC server(s) and/or other MTC device(s). A MTC device may also communicate locally (wirelessly, possibly through a PAN, or hardwired) with other entities which provide the MTC device raw data for processing and communication to the MTC servers and/or other MTC devices.

Machine-to-machine (M2M) communication has wide applications such as in smart metering, home automation, eHealth, fleet management, and the like. Accordingly, there is a need to lower operational costs associated with offering such new M2M services. In addition, for mobile terminated short message service (SMS) transfer, an SMS gateway mobile switching center (SMS-GMSC) may query a home location register (HLR) using a mobile station integrated services digital network number (MSISDN), and the HLR may provide the address for serving general packet radio service (GPRS) support node (SGSN)/mobile switching center (MSC) that may serve the MTC device. The network may use the MSISDN number to route the packet. However, there is a risk that MSISDN numbers may run out in the near future. Accordingly, for at least this reason, there is a need to provide an alternative to use of MSISDN numbers.

SUMMARY

Disclosed herein are method embodiments and apparatus embodiments for allocating IP addresses for MTC devices, transmitting and receiving SMS using the allocated IP addresses. In an embodiment, the MTC device may be allocated with an IP address without activating a packet data protocol (PDP) context. In addition, after the IP address has been allocated, SMS messages may be transmitted from and to MTC devices using the IP address.

In an embodiment, an IP address may be allocated statically to the MTC device. When the MTC device attaches to a network, the MTC device may inform the network of the static IP address. The static IP address may be stored in the HLR/home subscriber server (HSS). A corresponding MTC server may be pre-configured to have knowledge of the MTC device's IP address.

In another embodiment, an IP address may be dynamically assigned to the MTC device. For example, a gateway GPRS support node (GGSN) may assign the IP address to the MTC device when the MTC device attaches to a network. Upon receiving the IP address, the MTC device may then notify a corresponding MTC server of the assigned IP address. The notification message may include the MTC device IP address and a device or subscriber identifier for the MTC device. The subscriber identifier may be known to both the MTC server and the MTC device such that the MTC server can correlate the device with the IP address of the MTC device.

BRIEF DESCRIPTION OF THE DRAWINGS

A more detailed understanding may be had from the following description, given by way of example in conjunction with the accompanying drawings wherein.

DETAILED DESCRIPTION OF ILLUSTRATIVE EMBODIMENTS

Disclosed herein are method embodiments and system embodiments for allocating IP addresses for MTC devices, and for transmitting and receiving SMS using the allocated IP addresses. In an embodiment, the MTC device may be allocated with an IP address without activating a packet data protocol (PDP) context. In addition, SMS messages may be transmitted from and to MTC devices using the MTC device's IP address. In an embodiment, IP addresses may be allocated statically. In another embodiment, IP addresses may be dynamically assigned.

Figure 1:
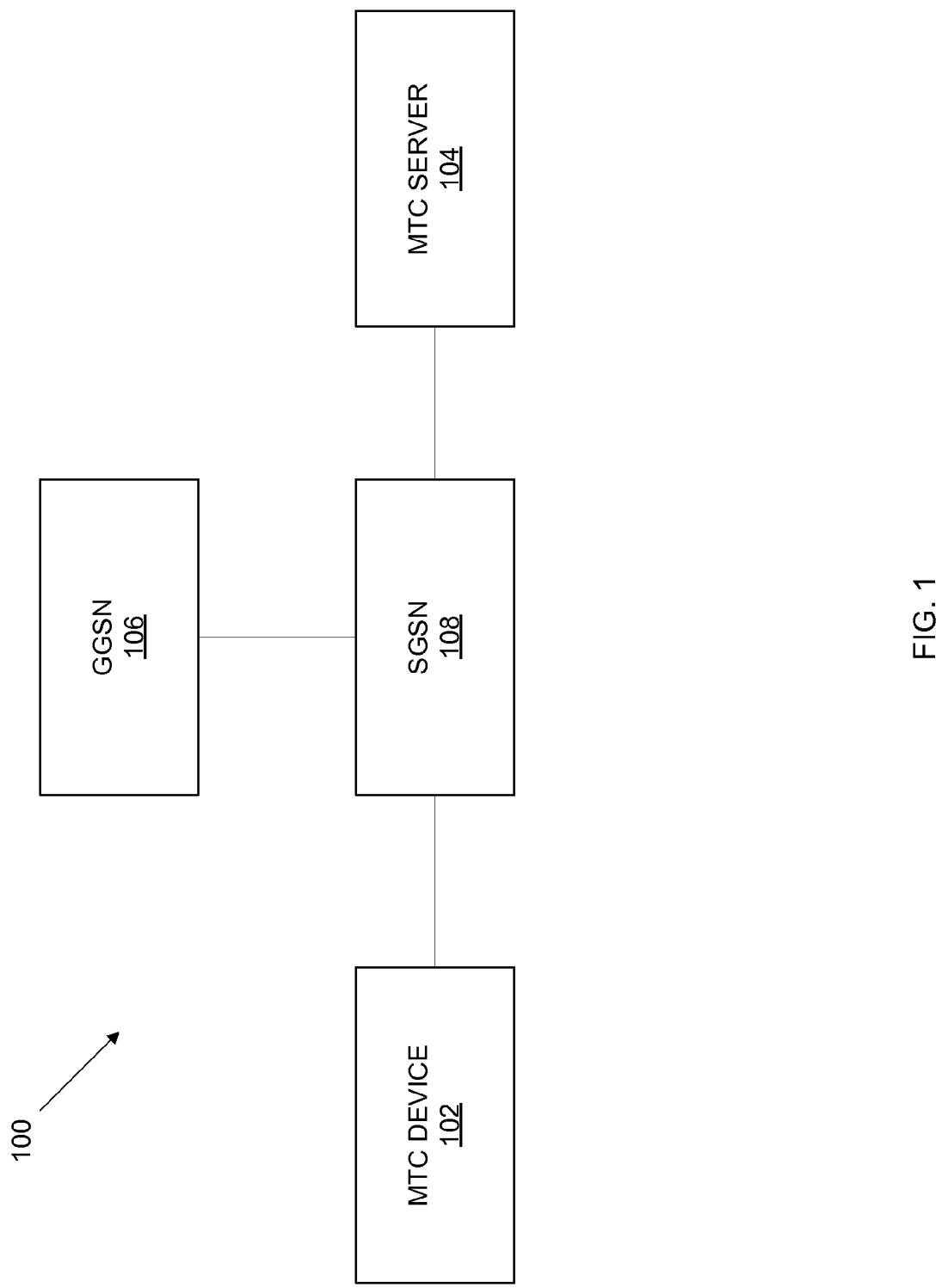
FIG. 1 a block diagram of an example wireless network for network address allocation in accordance with embodiments of the present disclosure.

FIG. 1 illustrates a block diagram of an example wireless network 100 for network address allocation in accordance with embodiments of the present disclosure. Referring to FIG. 1, the network 100 may include an MTC device 102 and an MTC server 104. The MTC device 102 may be operated by a subscriber having an agreement in place to provide M2M service through the network 100. Also, the MTC device 102 may be any suitable type of UE equipped for MTC communication. The MTC server 104 may include an entity that may directly communicate with the network 100, and may indirectly communicate with the MTC device 102 and other MTC devices (not shown for simplification of illustration) through the network 100. The MTC server 104 may also provide an interface for an MTC user, which may include a user that may use services of the M2M service. An MTC feature may include network functions that may be optimized for M2M applications For an M2M system, PDP context may be activated by the network 100, or by the MTC device 102. In LTE, the MTC device 102 may obtain a PDP context when it initially attaches to the network 100, and may keep the context until the MTC device 102 detaches from the network 100. In an example embodiment, the MTC device 102 may have an IP address and therefore may be reachable by the MTC server 104.

In GPRS/universal mobile telecommunications system (UMTS), the attach procedure and the PDP context procedure may be separate. In an example embodiment, an IP address may be assigned or allocated during the PDP context activation, for example, when a user wants to connect to the MTC server 104. To support mobile terminated connections, the MTC device 102 may need to maintain a PDP context. Constantly maintaining a PDP context may require additional network connections. It is noted that the signaling overhead and core network capacity impact of maintaining PDP context for a long period of time may be detrimental when supporting a large number of MTC devices with infrequent communication needs. Accordingly, decoupling the IP allocation process and the PDP context procurement process can conserve network resources and can reduce signaling while keeping the device attached with an IP address.

Static IP Address Allocation

In accordance with an embodiment, an IP address may be statically assigned or allocated to an MTC device. A static IP address of an MTC device may support network initiated PDP context activation. For example, a GGSN, such as the GGSN 106 shown in FIG. 1, may maintain and/or store static PDP information associated with a PDP address. To determine whether network-requested PDP context activation is supported for a PDP address, the GGSN 106 may check whether static PDP information for that PDP address exists.

In an embodiment for static IP address allocation, an operator or operator-controlled network node may assign or allocate an IP address to an MTC device. The assigned IP address may remain fixed. Subsequently, the MTC device may inform the network about the assigned IP address. As a result, a corresponding MTC server may look up the IP address of the MTC device, or query another network node for the IP address of the MTC device.

Referring to the example of FIG. 1, the MTC device may establish a PDP context during initial registration. For example, the PDP context may be established when the MTC device 102 turns on. In an embodiment, the MTC device 102 may notify or advertise the network 100 of its IP address during the attach procedure. For example, when attaching to the network 100, the MTC device 102 may inform the network of its IMSI or other subscriber identifier along with its IP address. The IP address of the MTC device 102 may be communicated to, for example, an HLR or HSS. A corresponding MTC server, such as the MTC server 104, may be pre-configured to have knowledge of the IP address of the MTC device 102.

In an embodiment, MO and MT connections may be implemented in the PS domain. By placing the IP address in an attach message, the MTC server 104 may look up the IP address of the MTC device 102 and may request the trigger of a PDP context activation.

Dynamic IP Address Allocation

Figure 2:
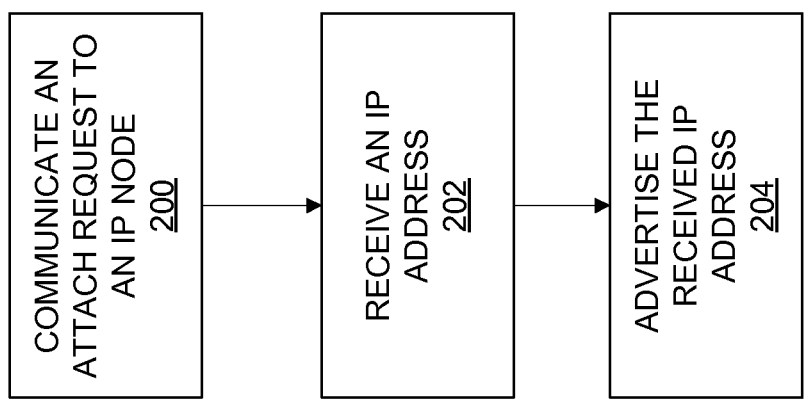
FIG. 2 illustrates a flowchart of an example method of dynamic network address allocation according to embodiments of the present disclosure.

In an embodiment, an IP address may be dynamically assigned or allocated to an MTC device. For example, FIG. 2 illustrates a flowchart of an example method of dynamic network address allocation according to embodiments of the present disclosure. This example method is described with respect to the example of FIG. 1 but should not be considered so limited as the method may also be applied to any other suitable network or system.

Referring now to FIG. 2, the method includes communicating an attach request to a network node (step 200). The SGSN 108 may forward the allocated IP address to the MTC device. For example, the SGSN 108 may send an attach response to the MTC device 102 including the allocated IP address.

The method of FIG. 2 may include communicating an attach request to a network node (step 202). For example, referring to FIG. 1, an IP address may be assigned to the MTC device 102 when attaching to the network 100. In this example, the GGSN 106 may assign the IP address to the MTC device 102. An SGSN 108 may send a request for creating an IP address to the GGSN 106, and may, in response, receive an IP address allocated to the MTC device 102 from the GGSN 106.

The method of FIG. 2 includes advertising the received IP address to a network server (step 204). In response to receiving the IP address, the MTC device 102 may notify the MTC server 102 of the allocated IP address via a message. Such a message may include the allocated IP address and the device or subscriber identifier of the MTC device 102. The subscriber or device identifier may be known to both the MTC server 104 and the MTC device 102 such that the MTC server 104 can correlate the MTC device 102 with the IP address of the MTC device 102. The message may also include information related to the MTC device, such as capabilities and supported features. Further, the MTC device 102 may also indicate to the MTC server 104 a PLMN identifier (e.g., the MCC+MNC) where the MTC device 102 may be registered.

After advertisement of the IP address, the MTC server 104 and the MTC device 102 may communicate via the IP address. For example, the MTC device 102 may request a PDP context activation in the case of a need for communication with the MTC server 104. Conversely, for example, the MTC server 104 may request a PDP context activation in the case of a need for communication with the MTC device 102. During the establishment of the PDP context activation, the MTC device 102 may notify the network that the MTC device 102 already has an IP address. For example, the MTC device 102 may populate the "PDP Address" field in the "PDP Context Request" message with the IP address. In an example, information associating the IP address and the IMSI of the MTC device may be stored in an HLR or HSS.

Figure 3:
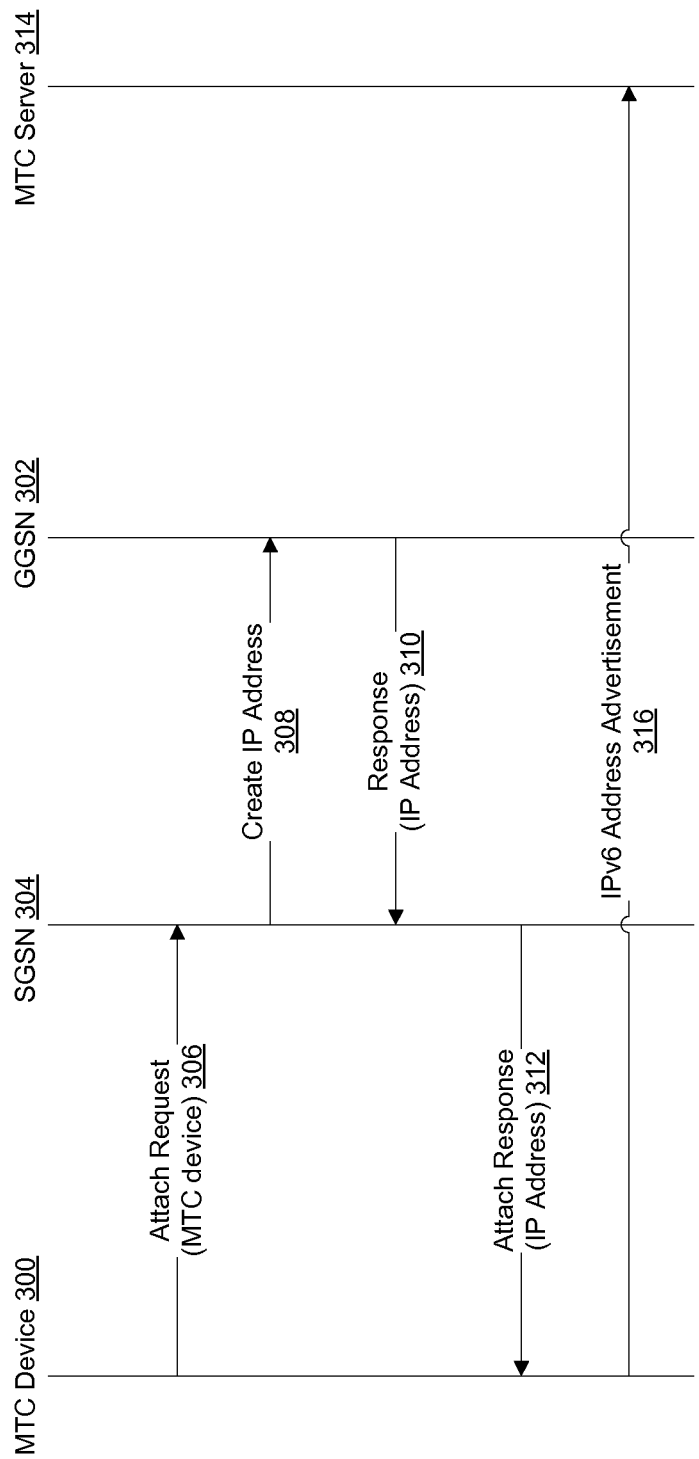
FIG. 3 illustrates a message flow diagram of an example process for dynamic IP address allocation in accordance with embodiments of the present disclosure.

FIG. 3 illustrates a message flow diagram of an example process for dynamic IP address allocation in accordance with embodiments of the present disclosure. For example, an IP address may be assigned to an MTC device 300 by a GGSN 302 when attaching to a network. Referring to FIG. 3, the MTC device 300 may send an attach request to an SGSN 304 with information indicating that the sender is an MTC (step 306). The SGSN 304 may send a request for creating an IP address to the GGSN 306 (step 308), and may receive an IP address allocated to the MTC device 300 from the GGSN 306 (step 310). The SGSN 304 may subsequently forward the allocated IP address to the MTC device 300, for example, in an attach response.

As shown in FIG. 3, upon receiving the IP address, the MTC device 300 may advertise the IP address to the network. For example, the MTC device 300 may notify an MTC server 314 of the assigned IP address via a message (step 316). The message may include the MTC device's IP address and a device or subscriber identifier. The device identifier may be known to both the MTC server 314 and the MTC device 300 such that the MTC server 314 can correlate the MTC device 300 with the IP address of the MTC device 300. The message may also include information related to the MTC device 300, such as capabilities and supported features. In addition, for example, the MTC device 300 may also indicate to the MTC server 314 the PLMN-ID (e.g. the MCC+MNC) where the MTC device 300 may be registered.

The MTC server 314 and the MTC device 300 may then communicate via the IP address. For example, the MTC device 300 may request a PDP context activation when the MTC device 300 wishes to communicate to the MTC server 314. The MTC server 314 may request a PDP context activation when the MTC server 314 wishes to communicate to the MTC device 300. During the establishment of the PDP context activation, the MTC device 300 may notify the network that the MTC device 300 already has an IP address. For example, the MTC device 300 may populate the "PDP Address" field in the "PDP Context Request" message with the given IP address. The relationship between IP address and IMSI may be stored in N HLR/HSS.

In an example benefit of dynamic address allocation, the IP allocation process and the PDP context procurement process may conserve network resources and may be decoupled. For example, an IP address may be assigned to an MTC device before the PDP context, for example, when the MTC device performs the attach procedure. The MTC device may remain attached with a dynamically allocated IP address without constantly maintaining a PDP context.

Mobile Terminated SMS with IP Address

In accordance with embodiments of the present disclosure, IP address allocation as disclosed herein may be used for SMS transmission and/or reception, for example, for mobile terminated SMS transfer. A mobile terminated SMS may be triggered by the MTC server to, for example, download information, send a request to the MTC device, or the like. As disclosed in examples provided herein, an MTC device may inform the network of an IP address allocated to the MTC device during an attach procedure such that the MTC server may have knowledge of the MTC device's IP address.

In an embodiment, an IP address may be included in the header encapsulating a mobile terminated SMS message. For example, the MTC server may encapsulate the SMS message with the IP address to the service center. In another embodiment, the MTC Server may send an SMS with the IP address in the body of the SMS message. In the header where the MSISDN may usually be populated, an MTC server may enter a pre-configured MSISDN. The pre-configured MSISDN may indicate that the receiver of the SMS is an MTC device, and may indicate that the body of the message may include an IP address. The pre-configured MSISDN may be created at the MTC server, for example, based on the PLMN-ID that the MTC device may have previously provided to the MTC server using a translation table. In another embodiment, a header that may include the IP address of the device may be created. For example, the SMS header format may be adjusted to include the IP address in the SMS header.

Figure 4:
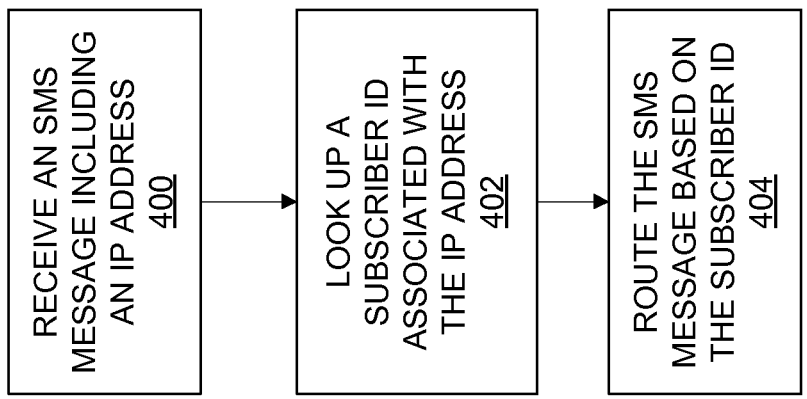
FIG. 4 illustrates a flowchart of an example method of transferring an SMS message according to embodiments of the present disclosure.
Figure 5:
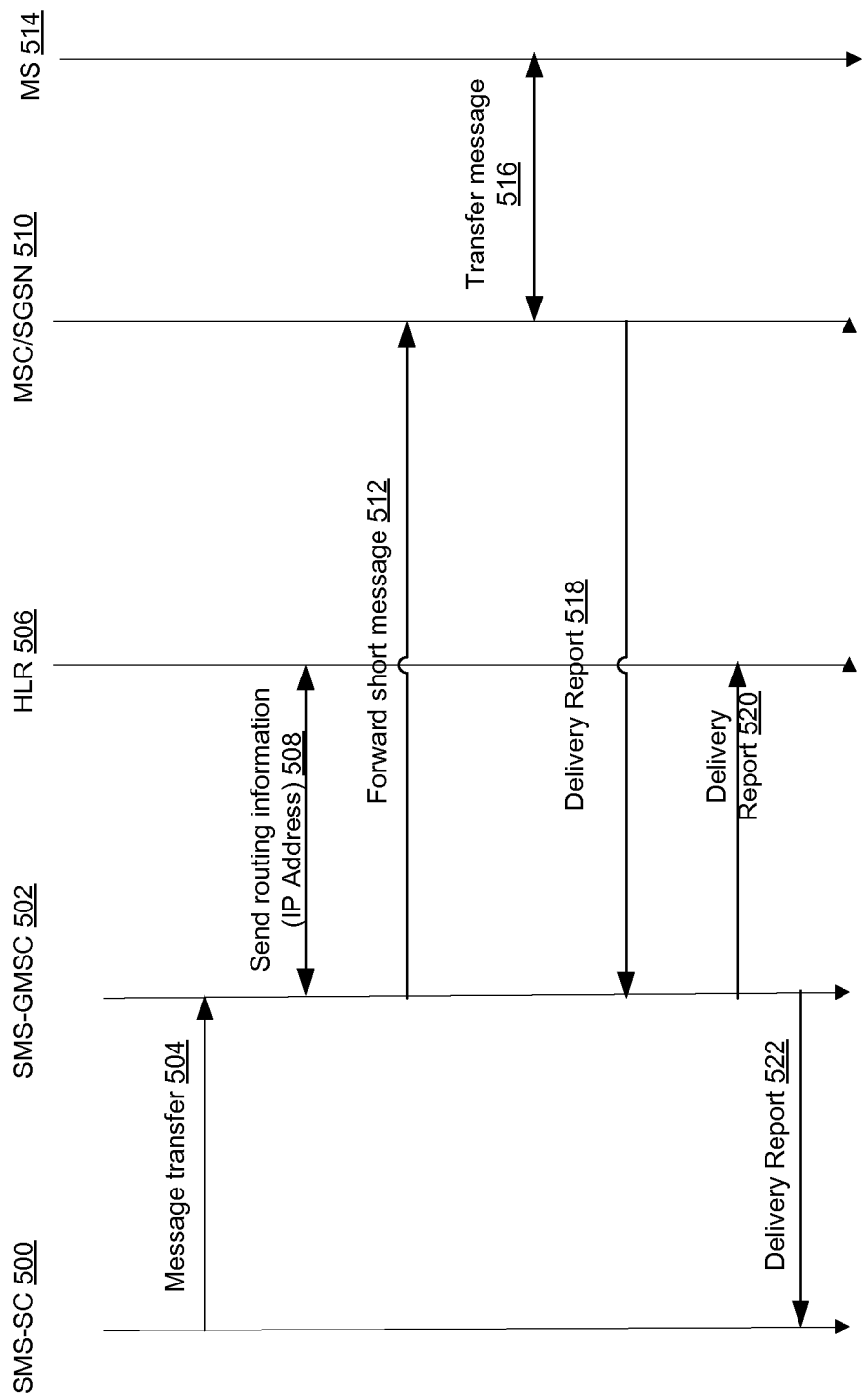
FIG. 5 illustrates a message flow diagram depicting MT SMS transfer in a network according to embodiments of the present disclosure.

FIG. 4 illustrates a flowchart of an example method of transferring an SMS message according to embodiments of the present disclosure. This example method is described with reference to the example of FIG. 5 but should not be considered so limited as the method may also be applied to any other suitable network or system. FIG. 5 illustrates a message flow diagram depicting MT SMS transfer in a network according to embodiments of the present disclosure. Referring to FIG. 4, the method includes receiving an SMS message including an IP address (step 400). For example, in the case of MT SMS transfer with an IP address, an SMS service center 500 may deliver an SMS message (SMS DELIVER) to an SMS-GMSC 502 through a data unit, such as a standard transfer protocol data unit (TPDU) and may include an IP address as a parameter associated with the data unit (step 504). The IP address may be, for example, a parameter that may replace an MSISDN parameter. More particularly, for example, the IP address may be included in the TP-originating address (TP-OA) field in an SMS-DELIVER type header. Further, for example, the data unit may include a flag, parameter, or other indicator to indicate that the IP address may be or is to be used as routing information, such as in place of an MSISDN. In an example, an SMS MAP interface may be modified to accommodate MT SMS transfer with the IP address. The SMS-GMSC 502 may receive the TPDU and subsequently inspect parameters of the TPDU. The SMS-GMSC 502 may determine that the IP address contained in the TPDU is to be used for routing based on the flag, parameter, or other indicator in the TPDU.

Referring now to FIG. 4, the method may include looking up a subscriber identifier associated with the IP address (step 402). For example, the SMS-GMSC 502 may, in response to determining that the IP address is to be used for routing, query an HLR 506 using the IP address (step 508). The SMS-GMSC 502 may interrogate the HLR 506 using the IP address. For example, the send routing information step 508 depicted in FIG. 5 may use the IP address. In an embodiment, a GSM MAP interface may be modified to accommodate MT SMS transfer with an IP address.

Continuing with the example of step 508, the HLR 506 may return an associated IMSI that may be mapped to the IP address and the signaling address of a corresponding serving SGSN and/or MSC/VLR, an example of which is depicted in FIG. 5 by MSC/SGSN 510. SMS-deliver procedures may continue from the SMS-GMSC 502 with the routing information such as, for example, the IMSI address.

Referring to FIG. 4, the method includes routing the SMS message based on the subscriber identifier (step 404). For example, in step 512, the SMS-GMSC 502 may forward the SMS message to the MSC/SGSN 510. The MSC may retrieve subscriber information from a VLR for mobile terminated short message transfer. Unsuccessful retrieval (e.g., absent subscriber) may be indicated by a cause indication to the SMS-GMSC. The SMS message may then be transferred from the MSC to a mobile station (MS) 514 that may be, for example, an MTC device (step 516). Subsequently, for example, the MSC/SGSN 510 may communicate a delivery report to the SMS-GMSC 502 (step 518). Next, the SMS-GMSC 502 may communicate delivery reports to the HLR 506 (step 520) and the SMS-SC 500 (step 522).

In another embodiment, an MTC server may send an SMS placing the IP address in the body of the SMS message. In the header where the MSISDN may usually be populated, the MTC server may enter a pre-configured MSISDN that may indicate that the receiver of the SMS is an MTC device, and may indicate that the body of the message may include an IP address. The pre-configured MSISDN may be created at the MTC server. For example, the pre-configured MSISDN may be created based upon the PLMN-ID that the MTC device may have previously provided to the MTC server, for example, using a translation table.

Using the MSISDN, the SMS message may be routed to a default SMS-GMSC in a respective home network. Different MSISDN numbers may be reserved for different subscribers. As described above, the relationship between IP address and IMSI may be stored in the HLR/HSS. The SMS-GMSC may query the HLR using the IP address, and the HLR may provide the address of the SGSN/MSC that may serve the MTC device. Once the SGSN/MSC receives the message, the SGSN/MSC may send the message to the destination MTC device.

In another embodiment, a new header which includes the IP address of the MTC device may be provided in the message. In this example, the IP address may replace the MSISDN.

Mobile Originated SMS Transfer with IP Address

In accordance with embodiments of the present disclosure, IP address allocation may be used for mobile originated (MO) SMS transfer. In an embodiment, an MTC server may have an MSISDN, an SC may have a signaling address, and association information between an IMSI and IP address of an MTC device or other UE may be stored in an HLR.

Figure 6:
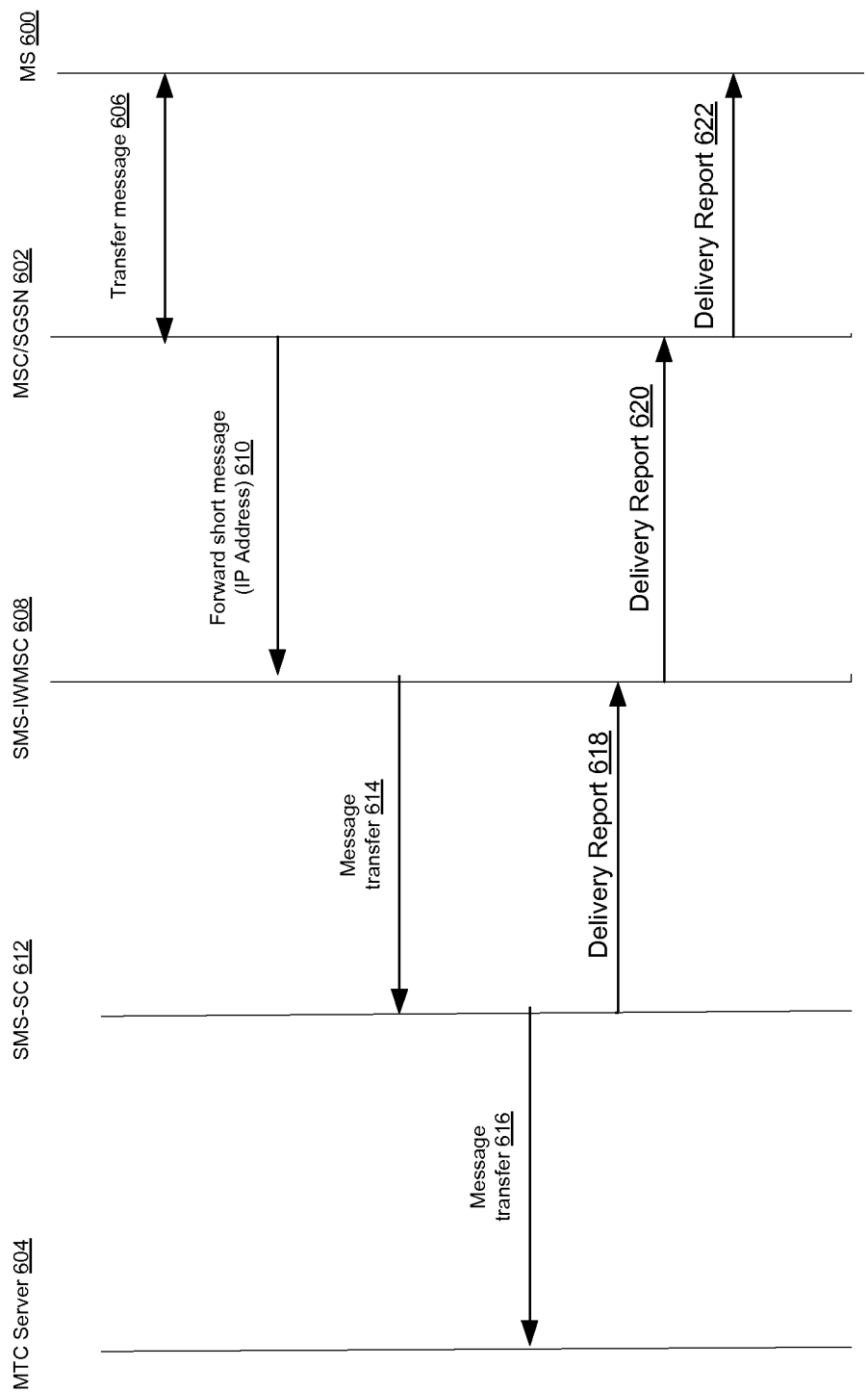
FIG. 6 illustrates a message flow diagram depicting MO SMS transfer with IP address in a network according to embodiments of the present disclosure.

FIG. 6 illustrates a message flow diagram depicting MO SMS transfer with IP address in a network according to embodiments of the present disclosure. Referring to FIG. 6, a mobile subscriber 600, such as an MTC device or other UE, may send an SMS message to an MSC/SGSN 602 using the MSISDN of an MTC server 604 as the destination address (step 606). The mobile subscriber 600 may know the MSISDN.

The MSC/SGSN 602 may receive the SMS message. In response to receiving the message, the MSC/SGSN 602 may forward the message to an SMS-IWMSC 608. An IP address allocated to the mobile subscriber 600 may be included in the forwarded message. As the IP address of the mobile subscriber 600 may be part of the subscription data, the IP address may be downloaded into the MSC/SGSN 602 during a registration procedure such as by the examples disclosed herein.

The MSC/SGSN 602 may add this allocated IP address to the outgoing SMS message toward an SMS service center (SMS-SC) 612. For example, the IP address may be included in the TP-destination address (TP-DA) field in an SMS-SUBMIT type header. The SMS-IWMSC 608 may forward the SMS message to the SMS-SC 612 (step 614). After receipt at the SMS-SC 612, the SMS-SC 612 may forward the SMS message to the MTC server 604 using, for example, SS7 signaling (step 616). For example, the MSISDN of the MTC server 604 may be used as the destination address. In an example, the IP address may be included in the body of the SMS message. Subsequently, for example, the SMS-SC 612 may communicate a delivery report to the SMS-IWMSC 614 (step 620). Next, the SMS-IWMSC 614 may communicate a delivery report to the MSC/SGSN 602 (step 622). Next, the MSC/SGSN 602 may communicate a delivery report to the mobile subscriber 600 (step 624).

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Though the example embodiments described herein are carried out in the context of IP address, it is to be understood that the technique applies to other network addresses. While the various embodiments have been described in connection with the various figures, it is to be understood that other similar embodiments may be used or modifications and additions may be made to the described embodiment for performing the same function of the various embodiments without deviating there from. Therefore, the embodiments should not be limited to any single embodiment, but rather should be construed in breadth and scope in accordance with the appended claims.

What is claimed:

1. A method for transferring a short message service (SMS) message, the method comprising:
  recognizing, by a first node of a communication network, a preconfigured mobile station integrated services digital network number (MSISDN) included in the SMS message, the preconfigured MSISDN being known to the first node as a trigger that the preconfigured MSISDN does not identify a recipient of the SMS message and to utilize an identifier other than an MSISDN of the recipient of the SMS message;
  identifying, by the first node, an Internet Protocol (IP) address included in a header encapsulating the SMS message upon recognizing the preconfigured MSISDN;
  obtaining, by the first node, an International Mobile Subscriber Identity (IMSI) that corresponds to the IP address based on the recognition of the preconfigured MSISDN, the IMSI being associated with a second node of the communication network, the second node being the recipient of the SMS message; and
  routing, by the first node, the SMS message toward a third node of the communication network based on the IMSI.

2. The method of claim 1, wherein the obtaining the IMSI further includes:
  obtaining, by the first node, the IMSI that corresponds to the IP address from a fourth node of the communication network.

3. The method of claim 1, further comprising:
  obtaining, by the first node, an address of the third node from a fourth node of the communication network.

4. The method of claim 3, wherein the fourth node includes a home location register (HLR).

5. The method of claim 4, further comprising receiving the IMSI from the HLR.

6. The method of claim 1, wherein the first node includes an SMS Gateway Mobile Switching Center (GMSC).

7. The method of claim 1, wherein the third node includes a Mobile Switching Center/Serving General Packet Radio Service (GPRS) Support node (MSC/SGSN).

8. A device configured to transfer a short message service (SMS) message, the device being a first node of a communication network, the device comprising:
  a memory;
  a processor, the processor configured at least to:
    recognize a preconfigured mobile station integrated services digital network number (MSISDN) included in the SMS message, the preconfigured MSISDN being known to the device as a trigger that the preconfigured MSISDN does not identify a recipient of the SMS message and to utilize an identifier other than an MSISDN of the recipient of the SMS message;

identify an Internet Protocol (IP) address included in a header encapsulating the SMS message upon recognizing the preconfigured MSISDN; and obtain an International Mobile Subscriber Identity (IMSI) that corresponds to the IP address based on the recognition of the preconfigured MSISDN, the IMSI being associated with a second node of the communication network, the second node being the recipient of the SMS message; and a transceiver, the transceiver configured at least to:
route the SMS message toward a third node of the communication network based on the IMSI.

9. The device of claim 8, wherein the processor is further configured such that the IMSI that corresponds to the IP address is obtained from a fourth node of the communication network.

10. The device of claim 8, wherein the processor is further configured to:

obtain an address of the third node from a fourth node of the communication network.

11. The device of claim 10, wherein the fourth node includes a home location register (HLR).

12. The device of claim 11, wherein the processor is further configured to obtain the IMSI from the HLR.

13. The device of claim 8, wherein the first node includes an SMS_Gateway Mobile Switching Center (GMSC).

14. The device of claim 8, wherein the third node includes a Mobile Switching Center/Serving General Packet Radio Service (GPRS) Support node (MSC/SGSN).

* * * * *